United States Patent [19]

Young

[11] Patent Number: 5,112,379
[45] Date of Patent: May 12, 1992

[54] MULTICOMPONENT SOIL SUPPLEMENT

[75] Inventor: Donald C. Young, Fullerton, Calif.

[73] Assignee: Union Oil Company of California, Los Angeles, Calif.

[21] Appl. No.: 114,458

[22] Filed: Oct. 29, 1987

Related U.S. Application Data

[63] Continuation of Ser. No. 664,885, Oct. 26, 1984, abandoned.

[51] Int. Cl.$^5$ ............................................. C05D 9/02
[52] U.S. Cl. .................................... 71/31; 71/64.06; 71/64.13; 71/904
[58] Field of Search ............... 71/11, 27, 28, 31, 64.06, 71/64.13, 33, 903, 904

[56] References Cited

U.S. PATENT DOCUMENTS

| | | | |
|---|---|---|---|
| 3,100,698 | 8/1963 | Horsley | 71/28 |
| 3,295,950 | 1/1967 | Blouin et al. | 71/64.07 |
| 4,133,668 | 1/1979 | Young | 71/11 |
| 4,219,347 | 8/1980 | Young | 71/11 |
| 4,302,237 | 11/1981 | Young | 71/11 |
| 4,326,875 | 4/1982 | Young | 71/11 |
| 4,334,906 | 6/1982 | Young | 71/33 |
| 4,342,577 | 8/1982 | Blouin et al. | 65/1 |

*Primary Examiner*—Ferris Lander
*Attorney, Agent, or Firm*—Gregory F. Wirzbicki; Michael H. Laird

[57] ABSTRACT

A particulate soil supplement comprising, as a discontinous phase, solid particles of a water-soluble plant nutrient dispersed throughout a continous sulfur phase or matrix. Preferably, said particulate soil supplement additionally comprises solid particles of a water-insoluble plant nutrient dispersed throughout the continuous phase. These compositions are obtained by dispersing said water-soluble plant nutrient and, preferably, said water-insoluble plant nutrients in molten sulfur, and quenching the resulting dispersion in a non-phytotoxic oil, that is non-reactive to, and immiscible with molten sulfur, e.g., a paraffinic oil, under shearing conditions sufficient to comminute and solidify said molten sulfur into particles. These compositions have particular utility in agronomic applications as soil supplements for supplying both sulfur (as sulfate) as well as other plant nutrients at a continuous, regulated rate from inexpensive raw materials.

18 Claims, No Drawings

MULTICOMPONENT SOIL SUPPLEMENT

This application is a continuation of application Ser. No. 664,855, filed Oct. 26, 1984 and now abandoned.

BACKGROUND OF THE INVENTION

1. Field of the Invention

The instant invention relates to compositions comprising a water-soluble plant nutrient in a form suitable for slow, continuous release of such nutrient to the soil by the natural influence of the environment, viz rain, air, and bacteria.

2. Description of the Art

Due to the increasing demands on the agricultural industry, there is a need for supplementing plant nutrients, either by soil or foliar application. These nutrients include a variety of micronutrients, such as zinc, iron, copper, magnesium, manganese, molybdenum and boron as well as the micronutrient or fertilizers, i.e., nitrogen, phosphorus and potassium. Elemental sulfur may be utilized to supply water-soluble sulfate, an additional nutrient, and has the further advantage of reducing soil alkalinity.

It is often desirable to supplement soil concentrations of more than one of these nutrients in a single application. Thus it would be beneficial to have a single nutrient combination in an easily handleable form that would not segregate during transport or application.

Obviously, all of the nutrients could be supplied individually, and that procedure has the equally obvious advantage of allowing immediate on-site variation of nutrient concentration. However, it has the disadvantage that all nutrients are not maintained in immediate proximity to each other. In some cases this factor is not particularly significant. However, it is found that bacterial sulfur oxidation creates an acidic environment in the vicinity of the sulfur particles and that this environment can convert the insoluble oxides, carbonates and sulfides of the above micronutrients to soluble sulfates. This acidification even improves the mobility of all nutrients applied as water-soluble compounds in calcareous soils by reducing the tendency of otherwise mobile compounds to convert to immobile hydroxides, oxides, and the like. Nutrients, both micronutrients and the above macro nutrients, must be made available to the plant roots in a soluble, mobile form to allow their assimilation by the crop.

The acidizing effect of elemental sulfur applied in any reasonable dosages, e.g., 20 to 800 pounds per acre, exists only, or at least to a large extent, in the area adjacent the sulfur particle. Thus, at least in calcareous soils, soil pH will increase with distance from the particle surface. Due to this effect and the beneficial influence of sulfur acidification on nutrient mobility, particularly on the conversion of insoluble, immobile compounds to mobile forms, it would be desirable to assure that all of the applied nutrient is fixed in the immediate vicinity of, and preferably within, the sulfur particle. It is even more desirable that the nutrient compound be evenly distributed throughout the matrix of the sulfur particle to assure gradual nutrient release rather than a slugging effect that would result from alternative procedures such as surface coating a fertilizer or nutrient particle with a continuous sulfur envelope (For an example of surface coating a fertilizer particle, e.g. an oil-coated, ammonium, phosphate-nitrate with a dispersion comprising micronutrients in sulfur, see U.S. Pat. Nos. 3,295,950 and 3,342,577. Despite the fact that the sulfur-coated fertilizer particles, of these references, are disclosed as having a controlled dissolution rate, it is clear that the relatively large particle size of the water-soluble ammonium phosphate-nitrate will result in immediate release of nitrogen to the soil rather than continuous, slow release when the ammonium phosphate-nitrate is exposed, by dissolution of the sulfur envelope.)

There are a number of micronutrients sources. Some are soluble such as the sulfates, nitrates and complexes with chelating agents, all of which are known in the agricultural industry. Less expensive micro nutrients, however, can be obtained as the oxides, sulfides and carbonates, the oxides being particularly preferred due to availability and lowest cost. In U.S. Pat. Nos. 4,133,668, 4,302,237, and 4,326,875, there is disclosed a method for preparing fusions of water-insoluble micronutrients such as the above oxides, sulfides, and carbonates, in a sulfur matrix by quenching a molten mixture of sulfur and a water-insoluble micronutrients (said micro nutrient being incorporated in said sulfur as a hydrocarbon dispersion) with water. The concern with loss of water-soluble nutrients by dissolution in the water quench, utilized to comminute and solidify the molten mixture into particles, results in the absence of water-soluble nutrients combined in said fusion. Moreover, since the water quench does not substantially "wet" the molten sulfur, the surface area of the particulate sulfur fusion is not as low as desired for rapid degradation when applied to the soil as a source of nutrients.

Slurries of sulfur in oil are prepared by quenching molten sulfur in an oil bath. (See, for example, U.S. Pat. No. 3,663,478.) The patentees are concerned with pipeline transportation of sulfur and oil; therefore, there is no suggestion that water-soluble or water insoluble nutrients might be combined with the disclosed sulfur-oil slurry.

Therefore, it is one object of this invention to provide a method for producing homogeneous, solid fusions of fertilizers and in a continuous sulfur matrix.

Another object is the provision of improved, homogeneous solid fusions of fertilizers and micronutrients dispersed through a continuous sulfur matrix which assure an even, gradual nutrient release from the sulfur particles as a result of gradual bacterial oxidation.

Another object is the provision of methods for producing such solid fusions of sulfur, fertilized and, micronutrients.

Still another object is to provide high surface area particulate sulfur fusions which are more rapidly available as a source of nutrients when applied to the soil.

Other objects and advantages of the instant invention will be apparent from a careful reading of the specification below.

SUMMARY OF THE INVENTION

This invention provides a particulate soil supplement comprising, as a discontinuous phase, solid particles of a water-soluble plant nutrient dispersed throughout a continuous sulfur phase or matrix. Preferably, said particulate soil supplement further comprises solid particles of a water-insoluble plant nutrient dispersed throughout said continuous sulfur phase. For the purpose of this invention water-soluble plant nutrients are defined as having a solubility in water, at 25° C., of at least 0.5 percent, by weight. Water-insoluble plant nutrients, of course, are defined as having a solubility in water of less than 0.5 percent, by weight, at 25° C.

In the compositions of this invention, the water-soluble and water-insoluble plant nutrients exist as distinct and separate phases, within the sulfur matrix. These compositions are prepared by:

(a) dispersing said water-soluble and, optionally and preferably, said water-insoluble plant nutrients in molten sulfur, and (b) quenching said dispersion of step (a) in an immiscible oil under shearing conditions sufficient to comminute and solidify said dispersion into particles.

DETAILED DESCRIPTION OF THE INVENTION

In accordance with one embodiment of the present invention, substantially homogeneous solid fusions of particulate fertilizer and micronutrients dispersed in a continuous sulfur matrix are obtained by introducing a sulfur melt, containing at least about 10 weight percent of one or more finely divided wear-soluble plant nutrients dispersed therethrough, into a sheared hydrocarbon. In another embodiment of the invention, at least about 10 percent, by weight, of a finely-divided water soluble plant nutrient and at least about 0.5 percent, preferably at least 1.0 percent, by weight, of a water-insoluble plant nutrient are dispersed into a sulfur melt and the resulting dispersion introduced into a sheared hydrocarbon. Sufficient hydrocarbon and sufficient agitation are provided to suspend said molten sulfur in said hydrocarbon. The resulting suspension is then cooled to a temperature below the melting point of the sulfur to form particles of the homogeneous, nutrient-sulfur fusion.

The nutrient compounds are usually selected for their relatively low cost and availability. Water insolubility is neither necessary nor particularly desirable in that the sulfur-nutrient melt is comminuted and solidified by contacting under shearing conditions in the absence of water. Such nutrients may include the micronutrients, such as the oxides, sulfides and carbonates of zinc, iron, copper, magnesium, maganese, molybdenum and boron. Fertilizer nutrients include water soluble fertilizers such as urea, ammonium nitrate, ammonium phosphate, potash, etc. Of the micronutrients, the oxides are particularly preferred due to their availability and low cost.

Despite the known difficulty in dispersing water-soluble nutrients in molten sulfur, it has been found in this invention, if the nutrients are finely divided and sufficient shear is applied, that molten nutrient-sulfur dispersions, adequate for preparing homogeneous solid particles of sulfur and nutrients, may be prepared. The finely divided nutrients may also be dispersed in or wetted with a hydrocarbon oil, prior to dispersing in molten sulfur, if desired. In general, since pre-dispersing or wetting the finely divided nutrients with a hydrocarbon is an additional step, it is omitted. The nutrients are preferably dispersed in the molten sulfur as finely divided particles passing 50 mesh and more preferably passing 100 mesh U.S. Standard screen.

The methods and compositions of this invention have several significant advantages over those known to the prior art. They allow for the use of inexpensive, readily available, water-insoluble oxides, sulfides and carbonates to provide the micronutrient content and the common water-soluble sources of nitrogen, phosphorus and potassium to provide the nitronutrients or fertilizer content of the composition of this invention. They result in easily obtained, homogeneous, dispersions of both micronutrients and fertilizer nutrients in the sulfur matrix. They minimize or completely eliminate nutrient loss during formulation or shipment, and they do not so weaken the product particles as to make them friable in transport or use.

The hydrocarbon which is incorporated into the sulfur matrix from either the quenching medium or as the hydrocarbon utilized to disperse the nutrients, upon cooling, results in several advantages. The product particles, when formed as such, are more fluid than are particles not containing hydrocarbon. They have significantly less tendency to dust or autoignite during transport or use, and they do not bridge and plug transportation and application equipment. Product homogeneity assures more uniform nutrient release. The hydrocarbon also accelerates heterotrophic bacteria activity and therefore increases nutrient release rate.

The preferred metal nutrients are zinc, iron, copper, magnesium, maganese, molybdenum and boron in the form of the corresponding oxides, carbonates and sulfides. The oxides are particularly preferred for the reason discussed above. It is also found that these materials, particularly the oxides, may be dispersed into the molten sulfur at very high loadings to produce fluid suspensions containing up to 65 weight percent of the metal oxide.

The preferred fertilizer nutrients are urea, ammonium nitrate, ammonium phosphate, phosphoric acid, potash, potassium sulfate, potassium chloride, dipotassium phosphate, etc. The fertilizers may also be dispersed in sulfur at loadings of up to 65 weight percent or more without substantial loss of fluidity.

The several components are preferably mixed in proportions sufficient to assure a product fusion containing at least about 40, preferably at least about 50 weight percent sulfur. The remainder of the product may comprise hydrocarbon (e.g., from 0.5 to 10 percent, preferably from about 2 to about 7 percent, by weight) and nutrient compound and/or other solid components such as fillers, clays and the like, as desired. These compositions may contain 1 to about 50, preferably 1 to about 20, weight percent of the nutrient (other than sulfur).

The hydrocarbon acts as the quenching medium as well as the means to comminute the molten nutrient-sulfur. Thus, sufficient hydrocarbon must be present during the quenching conditions. The velocity of the hydrocarbon, agitated under shearing conditions, comminutes and solidifies the molten sulfur into a particulate product comprising the nutrients homogeneously dispersed throughout a continuous sulfur phase.

The sulfur melt, at a temperature of 120° to about 400° C., preferably 120° to about 250° C., is suspended in the hydrocarbon. However, in both batch and continuous operations it is preferred to meter the molten sulfur into a fluid hydrocarbon. This procedure facilitates more accurate composition control and leads to homogeneous products. It is adaptable to continuous operations in which the hydrocarbon and the sulfur melt are continuously combined, such as in an in-line mixer. Thus, the sulfur melt can be continuously transferred from a sulfur melt reservoir or other container and passed by pumps or under pressure into admixture with the hydrocarbon quench which itself is continuously metered from a container. The sulfur melt reservoir is preferably provided with agitation means for maintaining an even suspension of the nutrient compound in the sulfur melt. These two streams are continuously mixed by any one of numerous known in-line mixers, surge tanks, or the like. The combination is then cooled or quenched to form the homogeneous fusion.

The hydrocarbons are preferably liquid at ambient conditions, or more appropriately, the temperature at which the molten nutrient-sulfur is added thereto. If this temperature is elevated, it is essential only that the hydrocarbon be fluid at that temperature to allow adequate mixing of the hydrocarbon and the molten sulfur. The hydrocarbons should have a boiling point below the temperature at which the sulfur melt is combined to avoid flashing and hydrocarbon vapor evolution in the mixing apparatus.

Suitable hydrocarbons include virgin or partially refined crudes or synthetic crudes, e.g., derived from coal, oil shale or other origins of natural or synthetic paraffins, aromatics and/or alkyl aromatics. Illustrative are paraffin waxes, gas oils, crude oils, crude oil residuum, naphtha, diesel oil fuel oil, light and heavy gas oils, kerosene, jet fuel, 80 to 300 neutral oils, paraffin waxes, hydrocarbon homo- or hetero-polymer oils, waxes or thermoplastics such as polyolefins, polystyrene and the like.

The hydrocarbons should be non-polar and non-reactive with sulfur or other components of the composition at melt temperatures. They are preferably paraffinic, aromatic or alkyl aromatic, or combinations of these. From the standpoint of reactivity and toxicity to both plants and sulfur-active bacteria, the hydrocarbons preferably contain, at most, only minor amounts (i.e. less than about 10 molar percent) of olefins alkynes, alkenyl aromatics or compounds containing reactive or toxic functional groups such as hydroxyl, amino, ether, aldo, keto or carboxyl groups, or the like. However, this exclusion does not apply to most halogenated hydrocarbons which are generally unreactive at least at the lower melt temperatures within the above ranges. Aromatics are somewhat more toxic to sulfur active bacteria than are paraffinic hydrocarbons. Accordingly, paraffins or compositions consisting primarily of paraffins are particularly preferred for agronomic use.

These methods do not require surfactants to obtain homogeneous distribution of the nutrients in the sulfur melt, or the suspension of the molten nutrient-sulfur in the hydrocarbon quench. In fact, such surfactants are preferably avoided at least in most applications due to their reactivity at melt temperatures and/or their toxicity or refractiveness to sulfur-active bacteria.

The hydocarbon quench has been surprisingly found to yield higher surface area particles of sulfur fusion than the prior art water quench. This higher surface area results in more rapid availability of the dispersed nutrients when the sulfur fusion of this invention is applied to the soil.

Particularly preferred methods involve quenching by any one of several techniques. The sulfur melt can be sprayed in which case particle size can be regulated by spray size and agitation severity. Other methods involve pouring the sulfur melt into an agitated hydrocarbon quench, in which case particle size is determined primarily by agitation severity.

Other methods involve contacting a high velocity spray comprising a dispersion of the plant nutrients in molten sulfur with a high velocity spray of the hydrocarbon to form a highly turbulent intersection zone of the two sprays in which the sulfur melt is simultaneously subdivided and quenched to provide porous particles.

Whichever method is used, it is often desirable to obtain particles having diameters of about 1 inch or less, usually about one-half inch or less. (The particles may not be perfectly spherical, therefore the diameter, referred to herein, is the greatest cross-sectional dimension of the particle.) Particles having diameters of about 0.02 to about 0.11 inch, and bulk densities below about 1.9, generally below about 1.3, preferably about 0.9 to about 1.3 grams per cc., may be conveniently produced by the above methods. They are further characterized by porosities of at least about 0.04, generally about 0.04 to about 0.15 cc per gram, and internal surface areas of at least about 20, preferably between about 30 and about 100 square meters per gram. (The internal surface area is understood, by those skilled in the art, to refer to the surface area within the pores of the sulfur particle.)

The invention is further illustrated by the following examples which are illustrative of various aspects of the invention, and are not intended as limiting the scope of the invention as defined by the appended claims.

EXAMPLE 1

A dispersion of potassium chloride in sulfur is made as follows: KCl is gradually added to molten sulfur, at a temperature of 125° C. and agitated with a 3-blade stirrer until a dispersion comprising 50% solids is obtained. The KCl as added is a finely-divided, particulate solid having an average particle size of about 50 mesh.

To the vortex of an agitated, surfactant-free, non phytotoxic, 90N paraffinic spray oil containing less than 15 weight percent aromatics and having an initial boiling point of 315° C. is added (slowly) 1000 gms of the molten dispersion of KCl in sulfur. The temperature of the oil is held below the point of boiling but above the melting point of the sulfur. After the sulfur is completely combined with the agitated hydrocarbon, the mixture is allowed to cool to room temperature, and the excess of the hydrocarbon is removed, by settling and filtration. The excess hydrocarbon may be recycled to the process. The particulate sulfur-KCl product has a particle size of 10 mesh or less and contains 50% S, 47% KCl and approximately 3% of the hydrocarbon. Particle analysis by scanning electron microscope establishes that the potassium chloride is homogeneously distributed throughout the matrix of each particle and that it is evenly distributed throughout the entire particle population.

EXAMPLE 2

By a similar method as disclosed in Example 1, the products of Table 1 are prepared.

Table 1

A. 50% S, 50% $K_2SO_4$
B. 50% S, 50% $NH_4H_2PO_4$
C. 50% S, 25% KCl, 25% $(NH_4)_2HPO_4$
D. 40% S, 30% Urea, 30% $K_2SO_4$
E. 56% S, 28% $K_2SO_4$, 8.9% $(NH_4)_2$, $HPO_4$, 3.7% $(NH_4)_2SO_4$ 1.6% $MnSO_4$, 0.74% $CaSO_4$, 0.14% $Na_2B_4O_7$, 0.66% $ZnSO_4$, 1.6% $FeSO_4$, and 0.001% $NaMoO_4$ The weight percents are based on the nutrient-sulfur melt. After quenching and separating excess hydrocarbon, the products comprise about 5 parts by weight hydrocarbon per 100 parts nutrient-sulfur. Composition E contains all the mineral nutrients required by plants in their correct ratios. The compositions of this process contain micronutrients in the form of water soluble components. Hence, as the sulfur is converted by soil bacteria, surges of release are observed as water soluble particles are exposed. These abrupt leaching stages leave cavities in the sulfur matrix, increasing the exposed sulfur surface area. Therefore, unlike sulfur compositions which contain only water-insoluble nutrients in a sulfur matrix and exhibit a constantly decreasing conversion rate, these particles show a constantly increasing conversion rate. Also, the presence of residual paraffinic oil enhances the conversion rate since it stimulates the activity of heterotopic thiobacillus that do not attack non-carbon containing sulfur.

EXAMPLE 3

Composition C is broadcast-applied at 500 lbs per acre on tomatoes (CAL-ACE variety) at Tracy, Calif. and compared with the same quantity of the same fertilizer materials applied in the conventional manner, i.e., without the sulfur matrix. Each treatment is replicated 3 times. At harvest the compositions C treated plots gives an average yield of 26.1 tons per acre. The conventionally fertilized plots have an average yield of 17.5 tons per acre.

EXAMPLE 4

Example 2E above and a particulate sulfur that is prepared by water quenching are mixed with green loose soil in which milo seeds are planted. The soils are periodically leached with water and the leachate analyzed for sulfate ion as an index of sulfur conversion by the reaction:

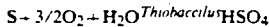

$$S + 3/2 O_2 + H_2O \xrightarrow{Thiobacillus} HSO_4$$

For this test both Example 2E and the water-quenched, particulate sulfur are screened through an 18 mesh sieve. The macropore volume of Example 2E and the water-quenched sulfur are measured by UTM 604-microbead method, (as more fully described in U.S. Pat. No. 3,637,351, incorporated, in its entirety, by reference hereto) as 0.69 and 0.14, cc/gm, respectively. Soils are dosed with 2 levels of each particulate sulfur, i.e., equivalent to 100 and 200 lbs sulfur/acre-6inch. Five and a half inch depth pots containing 3 lbs of virgin sandy loam soil are treated with 4.7 g or 9.5 g of Example 2E and 2.4 g or 4.7 g of water-quenched sulfur. Both particulate sulfur samples are placed in a band 1Δ under the soil and across the diameter of the pot. Nine milo seeds are planted in the pot at approximately ¾" depth. The pots with the growing crops of milo are leached with 350 ml of distilled water and the concentration of $SO_4^{2-}$ measured by Ion Exchange Chromatography. The results are summarized in Table 2, below.

TABLE 2

| | Mg./l $SO_4^{2-}$ Days from start of exp | | | | |
|---|---|---|---|---|---|
| | 6 | 12 | 19 | 24 | Total |
| Untreated Control (No S) | 123 | 64 | 60 | 44 | 291 |
| Example 2E 100 ppA | 683 | 613 | 597 | 247 | 2140 |
| Example 2E 200 ppA | 1490 | 1520 | 1430 | 580 | 5020 |
| Water-quenched sulfur 100 ppA | 129 | 53 | 86 | 68 | 336 |
| Water-quenched sulfur 200 ppA | 138 | 84 | 93 | 72 | 387 |

It is thus seen that the particulate sulfur fusions of the present invention disintegrate in the soil at a significantly increased rate as compared to the water-quenched sulfur particles. Thus the nutrients dispersed therein are more rapidly available for assimilation by plants.

EXAMPLE 5

Redwood seeds (Sequoia Simpervirons) are planted and germinated in a 50/50 mixture of vermiculite and this mixture is treated with 1,000, 4,000 and 7,000 pounds per acre-6 inch of a particulate sulfur fusion made according to Example 2E. After 5 months the redwood seedlings are harvested, dried and weighed. Each treatment is replicated 5 times. The mean weight for each of the treatments is summarized in Table 3 below.

TABLE 3

| Treatment | Seedling dried weight, grams* |
|---|---|
| Control (no treatment) | 156.2[a] |
| 1000 ppa Example 2E | 203.0[b] |
| 4000 ppa Example 2E | 219[b] |
| 7000 ppa Example 2E | 205.0[b] |

*Treatments with different letters are significantly different at the 99% C.L. (Duncans Multiple Range Test).

Thus it is clear that the particulate sulfur fusions of the present invention significantly increase the growth of redwoods.

EXAMPLE 6

Approximately two acre plots are established in a mature redwood forest (Sequoia Simpervirons) near Ft. Bragg, Calif. on a Van Damme soil type. The plots are treated by surface broadcasting with (a) 200 lbs/acre N (urea) and 200 lbs./acre Example 2E, (b) 200 lbs/acre N, (urea) and (c) 400 lbs/acre N (urea). Each treatment is replicated 36 times. Two years after treatment, the growth increase of each plot is determined using standard forestry measurement methods. The mean percent growth increase relative to the untreated plots is report in Table 4 below.

TABLE 4

| | Sample | Growth |
|---|---|---|
| (a) | 200N + 200 Example 2 E | 54% |
| (b) | 200N | 17% |
| (c) | 400N | 24% |

Again, the particulate sulfur fusions of the present invention provide a significant increase in the weight of redwoods. This increase, as shown, is over and above the effect of the nitrogen fertilizer applied in combination therewith.

While particular embodiments of the invention have been described, it will be understood of course that the invention is not limited thereto since many obvious modifications can be made, and it is intended to include within this invention any such modifications as well fall within the scope of the appended claims.

Having now described the invention, I claim:

1. A plant nutrient composition comprising particles of a water-soluble plant nutrient dispersed throughout the sulfur matrix of sulfur particles having average particle diameters of about ½ inch or less prepared by the method including the steps of admixing a sulfur melt comprising about 1 to about 50 weight percent solid particles of a water-soluble plant nutrient and at least about 40 weight percent molten sulfur with a non-phytotoxic oil with sufficient agitation and under conditions sufficient to comminute and solidify said sulfur melt in said oil and form said sulfur particles having average particle diameters of about ½ inch or less and containing about 1 to about 50 weight percent of said water-soluble, plant nutrient particles dispossessed throughout the continuous sulfur matrix of said particles.

2. The composition defined in claim 1 wherein said sulfur particles have a bulk density of about 1.9 g/cc or less and a porosity of at least about 0.04 cc/g, and said sulfur melt is admixed with said oil with agitation and under conditions sufficient to comminute and solidify said sulfur melt into said sulfur particles having said bulk density and porosity.

3. The composition defined in claim 1 wherein said sulfur melt is admixed with said oil with agitation and under conditions sufficient to comminute and solidify said melt into said sulfur particles having a bulk density of about 1.3 g/cc and a porosity of at least about 0.04 cc/g.

4. The composition defined in claim 3 wherein said nutrient particles are selected from the group consisting of water soluble compounds of zinc, iron, copper, magnesium, manganese, molybdenum, boron, and combinations thereof.

5. The composition define in claim 1 comprising about 1 to about 20 weight percent of said water-soluble, plant nutrient particles selected form the group consisting of water-soluble compounds of zinc, iron, copper magnesium, manganese, molybdenum, boron, and combinations thereof, said sulfur constitutes at least about 50 weight percent of said composition, and said sulfur melt is admixed with said oil with agitation and under conditions sufficient to comminute and solidify said melt into said sulfur particles having a bulk density of about 1.9 g/cc or less and a porosity of at least about 0.04 cc/g.

6. The composition defined in claim 1 wherein said oil comprises a hydrocarbon oil, said plant nutrient comprises a member selected from the group consisting of water soluble compounds of zinc, iron, copper, magnesium, manganese, molybdenum, boron, and combinations thereof, and said sulfur melt is admixed with said oil with agitation and under conditions sufficient to comminute and solidify said melt into said particles having a bulk density of about 1.3 g/cc or less and a porosity of at least about 0.04 cc/g.

7. The composition defined in claim 1 wherein said nutrient particles are dispersed throughout said sulfur melt and said sulfur particles as discreet, solid, nutrient particles having average particle diameters of about 50 mesh or less.

8. The composition defined in claim wherein said sulfur melt is admixed with said oil with agitation and under conditions sufficient to comminute and solidify said melt into sulfur particles a having average particle sizes within the range of about 0.02 to about 0.11 inch and bulk densities of about 1.3 g/cc or less.

9. The composition defined in claim 8 herein said oil is a hydrocarbon oil, and said nutrient particles comprise a mere selected rom the group consisting of water-soluble compounds of zinc, iron, copper, magnesium, manganese, molybdenum, boron, and combinations thereof.

10. The composition defined in claim 9 wherein said nutrient particles are dispersed throughout said sulfur melt and said sulfur particles in the form of solid particles having average particle diameters of about 50 mesh or less.

11. A plant nutrient comprising sulfur particles of a homogeneous, solid fusion of water-soluble, plant nutrient particles dispersed throughout the continuous sulfur matrix of said sulfur particles containing at least about 50 eight percent sulfur and about 1 to about 50 weight percent of said water-soluble, plant nutrient particles dispersed throughout said sulfur matrix as solid nutrient particles having average particle diameters of about 50 mesh or less, said sulfur particles being produced by the method including the step of forming a dispersion of said solid nutrient particles in molten sulfur to form a nutrient-particle-containing sulfur melt and quenching said sulfur melt in a non-phytotoxic, hydrocarbon oil with agitation and under conditions sufficient to comminute and solidify said sulfur melt into sulfur particles having average particle diameters of about ½ inch or less and a bulk density of about 1.3 g/cc or less.

12. The composition defined in claim 11 wherein said sulfur melt is admixed with said oil with agitation and under condition sufficient to comminute and solidify said sulfur melt into sulfur particles having average particle diameters of about 0.02 to about 0.11 inch.

13. The composition define din claim 12 wherein said nutrient particles comprise a member selected from the group consisting of water-soluble compounds of zinc, iron, copper, magnesium, manganese, molybdenum, boron and combinations thereof, and said nutrient is dispersed throughout said sulfur matrix in the form of solid, nutrient particles having average particle diameters of about 50 mesh or less.

14. The composition defined in claim 11 wherein said nutrient particles are dispersed throughout said sulfur melt and said sulfur particles as solid nutrient particles having average particle diameters of about 50 mesh or less.

15. A method for applying fertilizer to soil which comprises applying to said soil the composition defined in any one of claims 1-13 or 14.

16. A method for fertilizing growing plants which comprises applying to the soil in the vicinity of said plants the composition defined by any one of claims 1-13 or 14.

17. A soil comprising the plant nutrient composition defined in claim 11.

18. A method for fertilizing growing plants which comprises applying to the soil in the vicinity of said plants a plant nutrient comprising sulfur particles of a homogeneous, solid fusion of water-soluble, plant nutrient particles dispersed throughout the continuous sulfur matrix of said sulfur particles containing at least about 50 weight percent sulfur and about 1 to about 50 weight percent of said water-soluble, plant nutrient particles dispersed throughout said sulfur matrix as solid nutrient particles having average particle diameters of about 50 mesh or less, said sulfur particles being produced by the method including the steps of forming a dispersion of said solid nutrient particles in molten sulfur to form a nutrient-particle-containing sulfur melt and quenching said sulfur melt in a non-phytotoxie, hydrocarbon oil with agitation and under conditions sufficient to comminute and solidify said sulfur melt into sulfur particles having average particle diameters of about ½ inch or less and a bulk density of about 1.3 g/cc or less.

* * * * *

UNITED STATES PATENT AND TRADEMARK OFFICE
CERTIFICATE OF CORRECTION

PATENT NO. : 5,112,379　　　　　　　　　　　　　Page 1 of 2

DATED : May 12, 1992

INVENTOR(S) : Donald C. Young

It is certified that error appears in the above-identified patent and that said Letters Patent is hereby corrected as shown below:

Column 1, line 46, replace "macro nutrients" with macronutrients --.

Column 2, line 12, replace "micro nutrients" with micronutrients --.

Column 2, line 40, after "and" insert -- micronutrients --.

Column 6, line 60, after "$(NH_4)_2SO_4$" insert -- , --.

Column 7, line 34, replace "Thiobaccilus" with Thiobaccilus --.

Claim 1, column 9, line 6, replace "dispossessed" with dispersed --.

Claim 5, column 9, line 27, replace "define" with -- defined --.

Claim 8, column 9, line 54, after "claim" insert -- 1 --; line 57, delete "a".

Claim 9, column 9, line 60, replace "herein" with -- wherein --; line 62, replace "mere" with -- member --; and line 62, replace "rom" with -- from --.

Claim 11, column 10, line 8, replace "eight" with -- weight --; line 13, replace "step" with -- steps --.

UNITED STATES PATENT AND TRADEMARK OFFICE
CERTIFICATE OF CORRECTION

PATENT NO. : 5,112,379
DATED : May 12, 1992
INVENTOR(S) : Donald C. Young

It is certified that error appears in the above-indentified patent and that said Letters Patent is hereby corrected as shown below:

Column 10, claim 13, line 26, "define din" should read --defined in--

Signed and Sealed this

Eighteenth Day of January, 1994

Attest:

BRUCE LEHMAN

*Attesting Officer*     Commissioner of Patents and Trademarks